(12) United States Patent
Kim et al.

(10) Patent No.: US 7,087,284 B2
(45) Date of Patent: Aug. 8, 2006

(54) HIGH DENSITY READABLE ONLY OPTICAL DISC AND METHOD OF PREPARING THE SAME

(75) Inventors: Hyun-ki Kim, Hwaseong-si (KR); Joo-ho Kim, Yongin-si (KR); Du-seep Yoon, Saononam-si (KR); In-oh Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/944,421

(22) Filed: Sep. 20, 2004

(65) Prior Publication Data

US 2005/0079313 A1    Apr. 14, 2005

(30) Foreign Application Priority Data

Sep. 22, 2003   (KR)   .................. 10-2003-0065534

(51) Int. Cl.
    *B32B 3/02*   (2006.01)
(52) U.S. Cl. ............... 428/64.1; 428/64.4; 439/270.12
(58) Field of Classification Search ............ 428/64.1, 428/64.4; 430/270.12
    See application file for complete search history.

(56) References Cited

U.S. PATENT DOCUMENTS 6,130,871 A    10/2000   Watabe
6,312,780 B1 *  11/2001  Kasami et al. ............ 428/64.1
6,741,549 B1 *   5/2004  Tominaga et al. .......... 369/285
6,848,115 B1 *   1/2005  Sugiura et al. ............ 720/719
6,896,946 B1 *   5/2005  Chen ...................... 428/64.1
2004/0161575 A1 * 8/2004  Hwang et al. ............. 428/64.8
2004/0257968 A1 * 12/2004 Kim et al. ................ 369/275.2
2005/0009260 A1 * 1/2005  Kim et al. ................ 438/202
2005/0106351 A1 * 5/2005  Hwang et al. ............. 428/64.4

FOREIGN PATENT DOCUMENTS

| JP | 62-184630 | 8/1987 |
| JP | 62-188026 | 8/1987 |
| KR | 1996-42544 | 12/1996 |
| KR | 1999-34079 | 5/1999 |

\* cited by examiner

*Primary Examiner*—Elizabeth Mulvaney
(74) *Attorney, Agent, or Firm*—Stein, McEwen and Bui, LLP

(57) ABSTRACT

A high density readable only optical disc includes a substrate having pits with different lengths in accordance with unit information, wherein a depth of the pit increases as the pit length increases; and a mask layer that includes a metal oxide, or a mixture of fine metal particles and a dielectric material. The high density readable only optical disc may be used to read pits not greater than a reading resolution limit and to obtain an optimal CNR since a pit depth is varied depending on a pit length. Also, a method of the high density readable only optical disc may be used to prepare a high density readable only optical disc having an optimal pit depth in accordance with a pit length.

32 Claims, 3 Drawing Sheets

15MHz, 100 nm 18.75MHz, 80 nm

30MHz, 50 nm ured, but the wavelength of a light source is λ and the numerical aperture of the objective lens is NA, λ/4NA represents a reading resolution limit. Thus, as # HIGH DENSITY READABLE ONLY OPTICAL DISC AND METHOD OF PREPARING THE SAME

CROSS-REFERENCE TO RELATED APPLICATIONS

This application claims the benefit of Korean Patent Application No. 2003-65534, filed on Sep. 22, 2003, in the Korean Intellectual Property Office, the disclosure of which is incorporated herein in its entirety by reference.

BACKGROUND OF THE INVENTION

1. Field of the Invention

The present invention relates to a high density readable only optical disc that allows reading of marks having a size not greater than the reading resolution limit of a laser beam by using a super-resolution near-field structure placed inside the disc, and a method of preparing the same.

2. Description of the Related Art

Optical discs are widely employed as high density recording media since they have a smaller recording area required per recording unit than the recording areas of conventional magnetic recording media. According to their characteristics, optical disks are classified into read only memory (ROM) optical discs that allow only reading of information recorded thereon, write once read many (WORM) optical discs that allow information to be recorded thereon only once, and erasable optical discs that allow information to be erased and re-recorded thereon.

A compact disc recordable (CD-R) is an example of the WORM optical disc. The CD-R includes a recording layer composed of an organic dye such as cyanine, phthalocyanine, and the like. A recording laser with a wavelength of 780 nm is irradiated onto the recording layer to decompose the dye layer, and a recorded signal may be read with a power of 1 mW or lower. The CD-R has a recording capacity of about 650 MB and is widely used for recording and reading various types of data such as text data, music, images, and the like.

However, optical recording media such as the CD-R or a compact disc rewritable (CD-RW) using a recording laser beam with a wavelength of 780 nm have insufficient capacity to store dynamic images, and thus, cannot be used in a complex multimedia environment.

To resolve the above problems, digital versatile discs (DVDs) having a capacity of 2.7–4.7 GB have been developed by using laser beams with a short wavelength of 630–680 nm. The DVDs are also classified into readable only DVD (DVD), write once read many DVD (DVD-R), and erasable DVD (DVD-RAM, DVD+RW, DVD-RW). Regarding the DVD-R, a recording laser beam is irradiated onto a recording layer to transform and decompose the recording layer, thus recording data. Regarding the DVD-RAM and DVD-RW, a change of the optical characteristic is caused by a change of phase, thus recording data. Since a DVD-R using an organic dye is more advantageous than other media in terms of compatibility with a DVD-ROM, price, and capacity, research is concentrated on developing it.

Regarding many media developed recently, the biggest issue is capacity, and various methods for increasing the capacity are being researched. The capacity of an optical disc predominantly depends on how many accurately reproducible and small pits may be formed in a fixed area and on the characteristics of a laser beam capable of accurately reading the pits. Although light emitted from a laser diode is focused through an objective lens, the light is not collected to one infinitely small point, and forms a beam having a finite width, which is called the diffraction limit. In the case of general optical discs, when the wavelength of a light source is λ and the numerical aperture of the objective lens is NA, λ/4NA represents a reading resolution limit. Thus, as the wavelength of the light source shortens, or the numerical aperture of the objective lens increases, the recording capacity increases. However, current laser technologies cannot provide lasers with a short wavelength, and the cost of manufacturing an objective lens with an increased numerical aperture is relatively high. Further, since as the numerical aperture of an objective lens increases, the working distance between the pickup and the disc considerably decreases, the surface of the disc may be damaged due to the collision of the pickup with the disc. As a result, data may be lost.

FIG. 1 is a graph illustrating the relationship between a length of a pit and a carrier to noise ratio (CNR) in a conventional readable only disc having a reflective silver layer formed on a substrate. As is apparent from FIG. 1, when the pit length is not less than 290 nm, the CNR is 40 dB or greater, and information recorded as pits is smoothly read. However, when the pit length is less than 290 nm, the CNR sharply decreases. In other words, when the pit length is 265 nm, the CNR is 16 dB, and when the pit length is 250 nm or lower, the CNR is close to 0.

To overcome the reading resolution limit, an optical disc having a super-resolution near-field structure (hereinafter referred to "super-resolution structure") is currently being sought through research. This optical disc is mainly applied to optical discs using a phase change recording manner, but may be applied to a readable only disc, too. Regarding the super-resolution structure, a special mask layer is formed in an optical disc, and when reading information, near field reading (NFR) is enabled by surface plasmon generated in the mask layer. Accordingly, the reading resolution limit problem is overcome, so that a very small recording mark may be read.

A metal oxide such as silver oxide is used for a mask layer in a recordable optical disc, and a metal oxide or fine metallic particle is used for a mask layer in a readable only optical disc.

FIG. 2 is a graph illustrating the CNR characteristic with respect to the pit (mark) depth of a readable only disc using the super-resolution structure. Referring to FIG. 2, in the case of a pit having a length not greater than the reading resolution limit, a disc having a pit depth of 50 nm shows a better CNR characteristic than the disc having a pit depth of 100 nm. However, in the case of a pit having a length not less than the reading resolution limit, the disc having a pit depth of 100 nm shows a better CNR characteristic than the disc having a pit depth of 50 nm. This indicates that an effective CNR characteristic may be obtained only when the pit depths are different with respect to the pit lengths. However, in conventional readable only optical discs, the pit depth is uniform, regardless of the pit length, because when manufacturing an original plate for a disc by conventional optical lithography or electron beam lithography, the pit depth cannot be adjusted in accordance with the pit length.

SUMMARY OF THE INVENTION

The present invention provides a high density readable only optical disc which allows reading of pits having a size not greater than the reading resolution limit, and has different pit depths in accordance with the pit lengths.

The present invention also provides a method of preparing the high density readable only optical disc.

According to an aspect of the present invention, a high density readable only optical disc includes: a substrate having pits with different lengths according to unit information, wherein a depth of the pit increases as the pit length increases; and a mask layer comprising a metal oxide, or a mixture of fine metal particles and a dielectric material.

According to another aspect of the present invention, a method of preparing a high density readable only optical disc includes: irradiating a laser beam onto an original plate for an optical disc in which a substrate, a first dielectric layer, a volume expansion layer comprising an alloy of a rare-earth metal and a transition metal, or a metal oxide, and a second dielectric layer are sequentially formed while varying an irradiation time; forming pits having various lengths and depths on the second dielectric layer by expanding the volume expansion layer through the irradiation of the laser beam; plating the original plate with a metal to form a stamper; separating the stamper; injection molding a substrate using the stamper; and forming on the substrate a mask layer comprising a metal oxide, or a mixture of fine metal particles and a dielectric material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

The present invention will now be described in more detail.

A high density readable only optical disc, according to an embodiment of the present invention, is characterized in that pits formed in a substrate have various lengths and pit depths are different in accordance with the pit lengths. In other words, when the pit length is greater, the pit depth is greater, and when the pit length is smaller, the pit depth is smaller, and thus an optimal CNR characteristic is obtained in accordance with the respective pit length.

Figure 1:
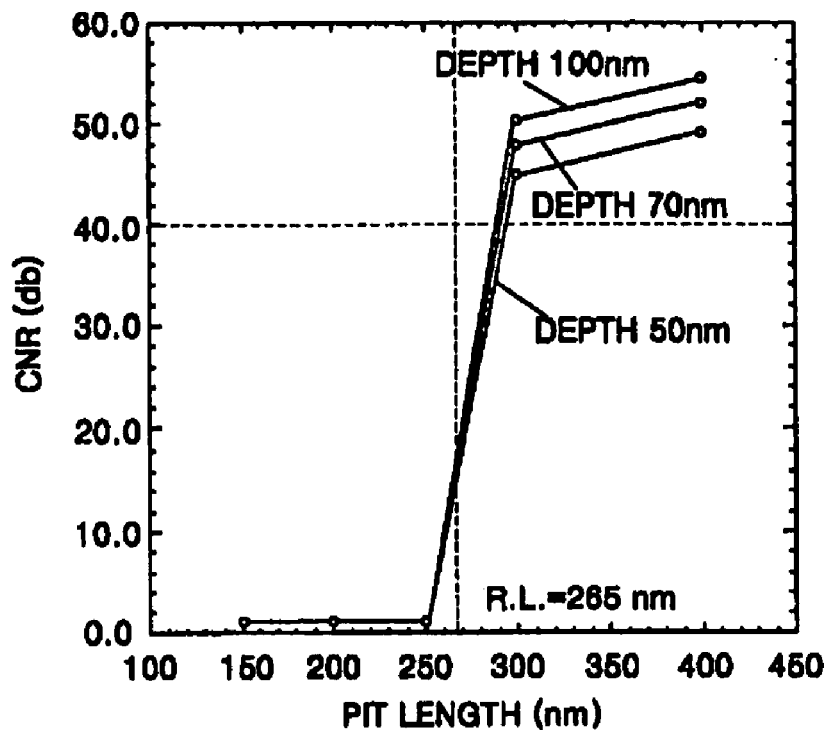
FIG. 1 is a graph illustrating a relationship of a pit length with respect to a carrier to noise ratio (CNR) in a conventional readable only optical disc.
Figure 2:
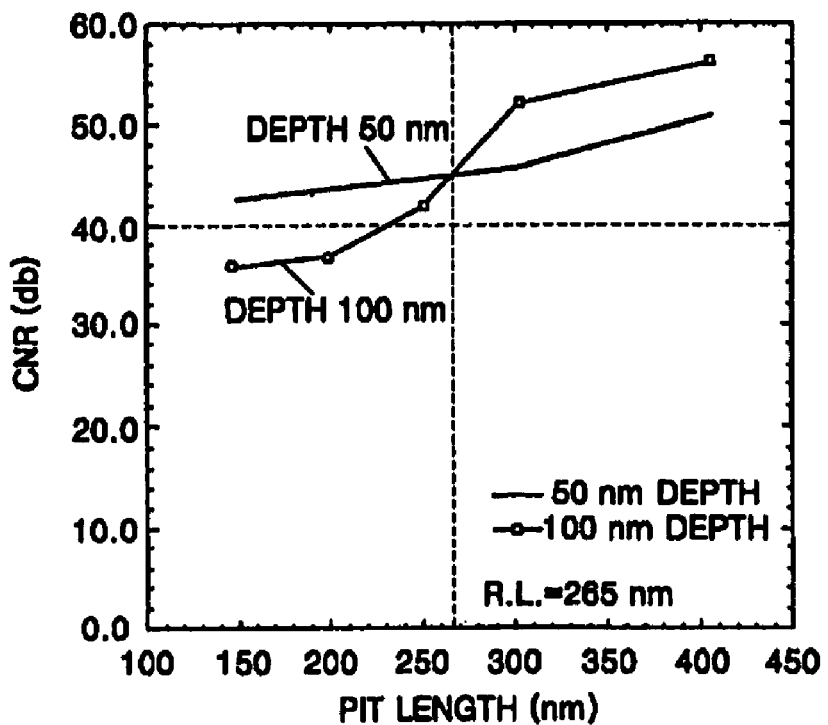
FIG. 2 is a graph illustrating a CNR characteristic in accordance with a pit depth of a readable only disc using the super-resolution structure of an embodiment of the present invention.
Figure 3:
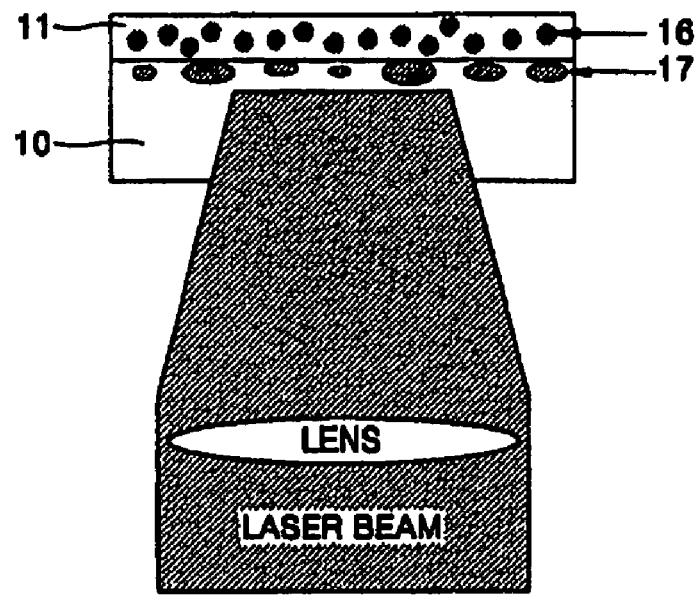
FIG. 3 is a schematic diagram of an optical disc according to an embodiment of the present invention, wherein a mask layer is formed on a transparent substrate having pits with different depths in accordance with the pit lengths.

FIG. 3 illustrates an optical disc according to an embodiment of the present invention in which a mask layer 11 is formed on a transparent substrate 10 having pits 17 with different depths according to the pit lengths.

The substrate 10 is composed of a material selected from materials having a high transparency in a wavelength range of the recording laser beams, effective impact resistance, heat resistance, environmental resistance, and the like, and which is capable of being molded by a conventional method of preparing a substrate, such as injection molding. Examples of such materials include polycarbonate, polymethylmethacrylate, epoxy, polyester, amorphous polyolefin, and the like.

The mask layer 11 may be composed of a metal oxide or a mixture of fine metal particles and a dielectric material. The metal oxide may be $PtO_x$, $PdO_x$, $AuO_x$, $AgO_x$, $WO_x$ or a mixture thereof. When using the metal oxide as the mask layer, the metal oxide is decomposed into fine metal particles and oxygen to form surface plasmon to obtain the effect of the super-resolution structure. Since a laser beam used during a reading process has insufficient power to decompose the metal oxide, the surface plasmon may not be formed. However, a minor amount of a metal particle 16 in a reduced form may be present in the mask layer 11, and the reduced metal particles 16 function as a source of the surface plasmon.

Meanwhile, when using the mixture of fine metal particles and the dielectric material as the mask layer, fine metal particles are dispersed in the dielectric material, and may directly function as a source of the surface plasmon.

The dielectric material used in the mask layer is an oxide, a nitride, a sulfide, or a fluoride of a metal, or a mixture thereof and examples thereof include $SiO_2$, $Al_2O_3$, $Si_3N_4$, SiN, ZnS, $MgF_2$, and the like. Rare metals such as gold, platinum, rhodium, palladium, and the like may be used as the metallic material dispersed in the mask layer. The dielectric material and the metallic material do not undergo a chemical reaction therebetween, so that the fine metal particles may maintain their shapes.

Although not illustrated in FIG. 3, the optical disc according to an embodiment of the present invention may further include a crystalline reading assist layer comprising Sb or $Sb_2Te_3$ between the substrate 10 and the mask layer 11. The crystalline reading assist layer is formed to enhance the effect of the super-resolution structure, while providing high reflectivity during a reading process, and is crystalline directly after being formed as a thin film.

Also, the optical disc according to an embodiment of the present invention may further include a reflective layer to provide high reflectivity during a recording or a reading process. The reflective layer may be composed of a metal having a high thermal conductivity and reflectivity to prevent the layer from being readily transformed. Thus, the reflective layer comprises a metal selected from the group consisting of Au, Al, Cu, Cr, Ag, Ti, Pd, Ni, Zn, Mg, and an alloy thereof, and is formed to a thickness of 50–150 nm by a general method such as vacuum deposition, electron beam, or sputtering. To assure sufficient reflectivity and reliability, the thickness of the reflective layer may be 60–120 nm.

The optical disc according to an embodiment of the present invention may further include a dielectric layer between the mask layer and the substrate, between the mask layer and the reflective layer, or on both sides thereof. The dielectric layer between the mask layer and the substrate prevents damage of the substrate due to heat, and the dielectric layer between the mask layer and the reflective layer functions as a diffusion preventing layer.

A dielectric substance used in the dielectric layer is an oxide, a nitride, a sulfide, or a fluoride of a metal or a mixture thereof, and examples thereof include $SiO_2$, $Al_2O_3$, $Si_3N_4$, SiN, ZnS, $MgF_2$, and the like.

The optical disc according to an embodiment of the present invention may further include a protective layer to protect other layers of the optical disc. The protective layer may be formed by a conventional method, for example, by spin coating an epoxy or acrylate UV-curable resin which has a high impact strength and is transparent on the reflective layer, and then, curing the coating with UV-rays.

A method of preparing a high density readable only optical disc according to another embodiment of the present invention includes irradiating a laser beam onto an original plate for an optical disc in which a substrate, a first dielectric layer, a volume expansion layer composed of an alloy of a rare-earth metal and a transition metal, or a metal oxide, and a second dielectric layer are sequentially formed while varying an irradiation time; forming pits having various lengths and depths on the second dielectric layer by expanding the volume expansion layer through the irradiation of laser beam; plating the original plate with a metal to form a stamper; separating the stamper; injection molding a substrate using the stamper; and forming on the substrate a mask layer comprising a metal oxide, or a mixture of fine metal particles and a dielectric material.

In the method, when irradiating the laser beam onto the original plate, a portion of the volume expansion layer onto which the laser beam has been irradiated is heated so that the temperature thereof is raised. At this time, a temperature in the heated region has a Gaussian distribution, and the temperature in a central portion of laser beam spot is the highest. When the temperature is higher than a specific critical temperature, a thermal transformation occurs to form a pit. Since the thermal transformation occurs in the central portion of the laser beam spot, a diameter of the pit is much smaller than the diameter of the laser spot.

Figure 4:
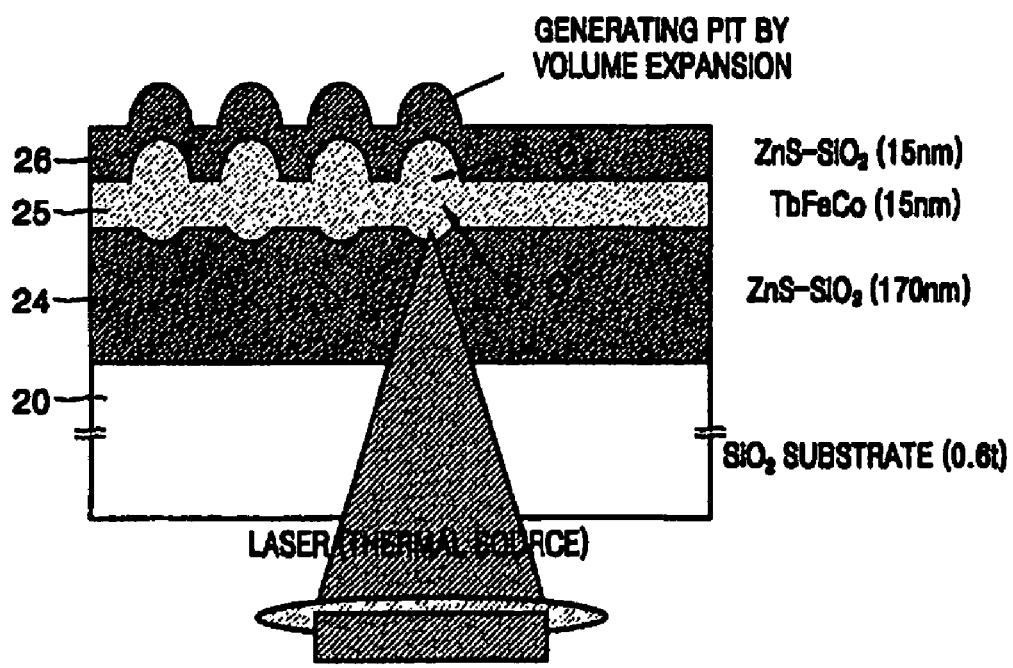
FIG. 4 is a schematic diagram illustrating a mechanism of forming a pit by irradiating a laser beam onto a substrate when a volume expansion layer is composed of TbFeCo.

FIG. 4 illustrates a mechanism wherein a pit is formed when an irradiating laser beam is irradiated onto the volume expansion layer of TbFeCo. That is, when the laser beam is irradiated onto the volume expansion layer of TbFeCo, heat is generated in the irradiated portion, and the TbFeCo is diffused into the dielectric layer or a substance of the dielectric layer (i.e., S) is diffused in the TbFeCo, or forms a compound with the dielectric substance in a portion heated to a higher temperature than the critical temperature by the generated heat. Since a volume of the compound formed at this time is expanded, a pit is formed in the second dielectric layer. The critical temperature of TbFeCo is about 350° C.

Meanwhile, when the volume expansion layer comprises a metal oxide such as PtOx, PdOx, AuOx, AgOx, or WOx, oxygen is generated in a portion heated by the irradiating laser beam of the volume expansion layer, thus, expanding the volume to form a pit.

A glass substrate 20 is generally used for the original plate for an optical disc. The glass substrate 20 is polished and rinsed, and then a first dielectric layer 24, a volume expansion layer 25, and a second dielectric layer 26 are sequentially formed on the glass substrate 20 by sputtering, or the like. Meanwhile, information recorded in the original plate is previously edited by an editor as information to be written in a substrate 10 of an optical disc. The edited information is emitted by a signal emission device, and thus, an irradiation time of the laser beam is adjusted to form pits having different lengths and depths. Then, an electrode for a plating process is applied to the resulting original plate, and a metal is plated to form a stamper. Then, the stamper is separated.

Finally, the stamper prepared by the mastering process is used to injection mold polycarbonate, or the like. As a result, the substrate 10 used in the optical disc according to an embodiment of the present invention is obtained.

Figure 5:
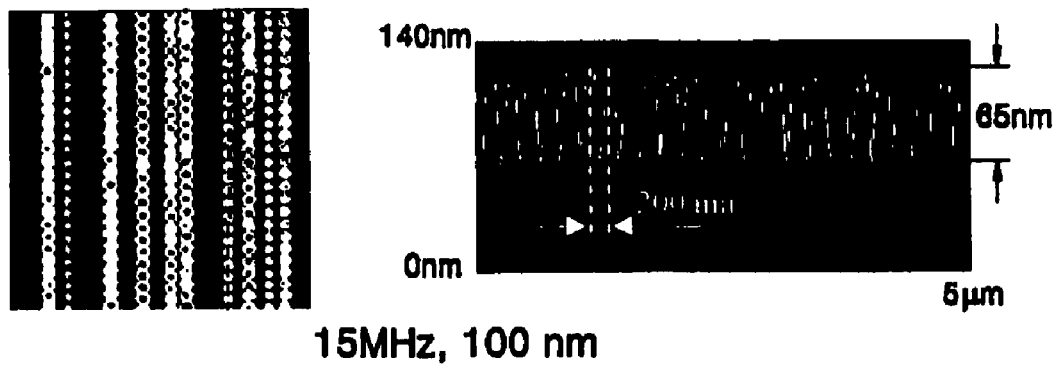
FIGS. 5 through 7 illustrate an Atomic Force Microscope (AFM) photograph of an original plate for an optical disc prepared according to another embodiment of the present invention.
Figure 6:
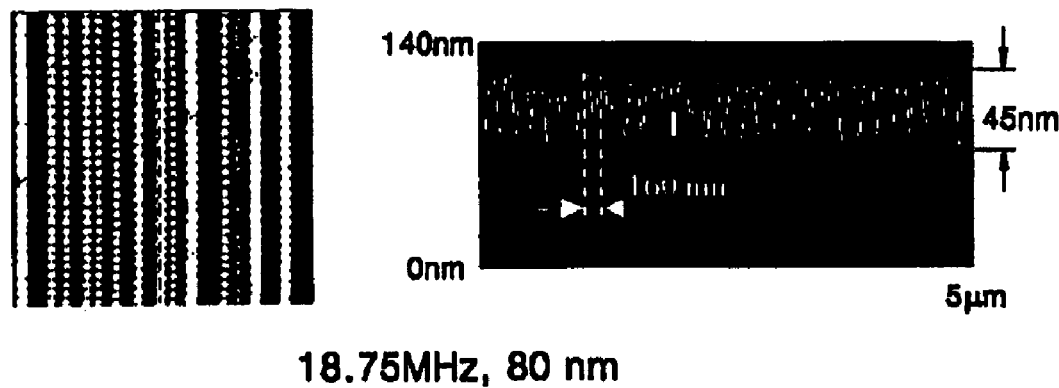
Figure 7:
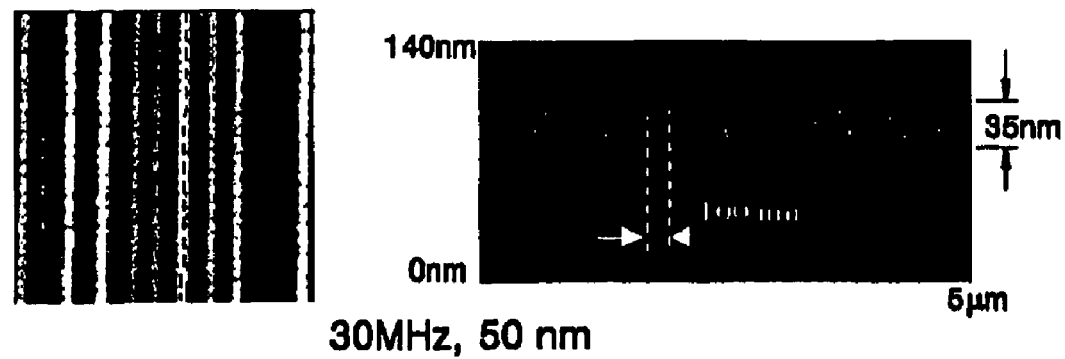

FIGS. 5 through 7 illustrate an AFM image of the original plate for the optical disc prepared according to another embodiment of the present invention. The left diagrams are top images and the right diagrams are cross-sectional views of portions represented by a dotted line in the left diagrams. The laser beam used had a wavelength of 405 nm and a numerical aperture (NA) of 0.65. In FIG. 5, a pattern having a pulse frequency of 15 MHz, a pit diameter of about 100 nm, and a pit depth of about 65 nm is formed.

Also, in FIG. 6, a pattern having a pulse frequency of 18.75 MHz, a pit diameter of about 80 nm, and a pit depth of about 45 nm is formed and in FIG. 7, a pattern having a pulse frequency of 30 MHz, a pit diameter of about 50 nm, and a pit depth of about 35 nm is formed. As is apparent from the above results, as the pit length increases, the pit depth increases. Accordingly, the pit depth is increased when the pit length is greater than the reading resolution limit, and the pit depth is decreased when the pit length is less than the reading resolution limit, and thus an optimal CN characteristic is obtained in the respective cases.

The present invention will be described in greater detail with reference to the following examples. The following examples are for illustrative purposes and are not intended to limit the scope of the invention.

EXAMPLE 1

1-(1) Preparation of a Substrate for an Optical Disc

A $ZnS$—$SiO_2$ layer with a thickness of 170 nm was formed as a first dielectric layer, a TbFeCo layer with a thickness of 15 nm was formed as an volume expansion layer, and a $ZnS$—$SiO_2$ layer with a thickness of 15 nm was formed as a second dielectric layer on a circular glass substrate with a thickness of 6 mm through sputtering, and then, a laser with a numerical aperture (NA) of 0.65 was used to prepare an original plate for an optical disc in which the track pitch is 0.74 μm, and pits having different depths according to the pit lengths from the pit depth of 50 nm when the minimum pit length was 200 nm to the pit depth of 440 nm when the maximum pit length was 680 nm were formed. An electrode for a plating process was applied to the resulting substrate, and then, nickel was plated to form a stamper. Next, the stamper was separated. Finally, the stamper prepared by the mastering process was used to injection mold polycarbonate, thus preparing a substrate for an optical disc with a thickness of approximately 0.6 mm.

1-(2) Preparation of an Optical Disc

A $ZnS$—$SiO_2$ target and a Pt target were cosputtered on the substrate prepared above 1-(1) with 400 W and 160 W, respectively, to form a mixed thin film with a thickness of approximately 50 nm. At this time, Ar was supplied at a rate of 20 sccm, the depositing pressure was 1.5 mTorr, and the volume ratio of $ZnS$—$SiO_2$ to Pt was 80:20.

EXAMPLE 2

A $ZnS$—$SiO_2$ layer was formed as a dielectric layer and a $ZnS$—$SiO_2$+Pt layer was formed as a mask layer through sputtering on the substrate for an optical disc prepared in Example 1-(1), and then, Ag was sputtered to a thickness of approximately 100 nm to form a reflective film. Then, a light curable resin protective layer was formed through spin coating to complete an optical disc. Here, the mixed layer of ZnS—SiO$_2$ and Pt as the mask layer was formed by cosputtering a ZnS—SiO$_2$ target and a Pt target with 400 W and 160 W, respectively, to form a mixed thin film having a thickness of 50 nm. Ar was supplied at a rate of 20 sccm, the depositing pressure was 1.5 mTorr, and the volume ratio of ZnS—SiO$_2$ to Pt in the thin film was 80:20.

EXAMPLE 3

Sb as a crystalline reading assist layer was sputtered on the substrate for an optical disc prepared in Example 1-(1) to form a thin film with a thickness of approximately 50 nm, and then, a ZnS—SiO$_2$ layer was formed as a first dielectric layer through sputtering. Thereafter, argon and oxygen were injected into a vacuum container, and a Pt target was sputtered to form a PtOx mask layer with a thickness of approximately 3.5 nm.

EXPERIMENTAL EXAMPLE 1

Performances of discs obtained in Examples 1 through 3 were evaluated on a DVD evaluation apparatus having a laser with a wavelength of 635 nm and a pickup with NA of 0.60. A line speed was 2 m/s, and a reading power was 2 mW. In this case, a reading resolution limit ($\lambda$/4NA) was 265 nm, and a minimum pit length in the DVD was 400 nm. In the optical discs prepared in Examples 1 through 3, a CNR of about 40 dB or greater, which was typical for practical usage, was obtained with respect to a pit with a length of approximately 150 nm. It was confirmed from the above results that an optimal CNR may be obtained by adjusting the pit depths in accordance with the pit lengths.

As described above, a high density readable only optical disc according to an embodiment of the present invention may be used to read pits not greater than reading resolution limit and may obtain an optimal C/N since the pit depth is varied depending on the pit length. Also, a method of the high density readable only optical disc according to another embodiment of the present invention may be used to prepare a high density readable only optical disc having the optimal pit depth in accordance with the pit length.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A high density readable only optical disc comprising:
a substrate having a plurality of pits with different lengths in accordance with unit information, wherein a depth of a pit of the plurality of pits increases as the pit length of the pit increases; and
a mask layer comprising:
a metal oxide, or
a mixture of fine metal particles and a dielectric material.

2. The high density readable only optical disc of claim 1, wherein the metal oxide is PtOx, PdOx, AuOx, AgOx, WOx or a mixture thereof.

3. The high density readable only optical disc of claim 1, wherein the fine metal particles are gold, platinum, rhodium, palladium, or a mixture thereof.

4. The high density readable only optical disc of claim 1, wherein the dielectric material is an oxide, a nitride, a sulfide, or a fluoride of a metal or a mixture thereof.

5. The high density readable only optical disc of claim 1, wherein the dielectric material is ZnS—SiO$_2$.

6. The high density readable only optical disc of claim 1, further comprising a crystalline reading assist layer composed of Sb or Sb$_2$Te$_3$ between the substrate and the mask layer.

7. The high density readable only optical disc of claim 1, further comprising a dielectric layer comprising an oxide, a nitride, a sulfide, or a fluoride of a metal, or a mixture thereof, on at least one surface of the mask layer.

8. The high density readable only optical disc of claim 7, wherein the dielectric layer is composed of ZnS—SiO$_2$.

9. A method of preparing a high density readable only optical disc, the method comprising:
irradiating a laser beam onto an original plate of an optical disc in which a substrate, a first dielectric layer, a volume expansion layer comprising an alloy of a rare-earth metal and a transition metal, or a metal oxide, and a second dielectric layer are sequentially formed while varying an irradiation time;
forming pits having various lengths and depths on the second dielectric layer by expanding the volume expansion layer through the irradiation of laser beam;
plating the original plate with a metal to form a stamper;
separating the stamper;
injection molding a substrate using the stamper; and
forming on the substrate a mask layer comprising:
a metal oxide, or
a mixture of fine metal particles and a dielectric material.

10. The method of claim 9, wherein the alloy of a rare-earth metal and a transition metal is TbFeCo and the volume of the volume expansion layer is changed by mutual diffusion with the dielectric layer or a chemical transformation through heating.

11. The method of claim 9, wherein the metal oxide is PtOx, PdOx, AuOx, AgOx, or WOx and the volume of the volume expansion layer is changed by discharging oxygen through heating.

12. The method of claim 9, wherein as the length of the pit formed increases, the depth of the pit increases.

13. The high density readable only optical disc of claim 1, further including a crystalline reading assist layer composed of Sb or Sb$_2$Te$_3$ between the substrate and the mask layer.

14. The high density readable only optical disc of claim 1, further including a reflective layer disposed on the mask layer.

15. The high density readable only optical disc of claim 14, wherein the reflective layer comprises a metal selected from the group consisting of Au, Al, Cu, Cr, Ag, Ti, Pd, Ni, Zn, Mg, and an alloy thereof.

16. The high density readable only optical disc of claim 14, wherein the reflective layer is formed to a thickness of approximately 50–150 nm.

17. The high density readable only optical disc of claim 16, wherein the reflective layer is formed to a thickness of approximately 60–120 nm.

18. A high density readable only optical disc comprising:
a transparent substrate having a plurality of pits with different lengths in accordance with unit information, wherein a depth of a pit of the plurality of pits increases as the pit length of the pit increases; and
a mask layer comprising:
a metal oxide, or
a mixture of fine metal particles and a dielectric material.

19. The high density readable only optical disc of claim 18, wherein the metal oxide is PtOx, PdOx, AuOx, AgOx, WOx or a mixture thereof.

20. The high density readable only optical disc of claim 18, wherein the fine metal particles are gold, platinum, rhodium, palladium, or a mixture thereof.

21. The high density readable only optical disc of claim 18, wherein the dielectric material is an oxide, a nitride, a sulfide, or a fluoride of a metal or a mixture thereof.

22. The high density readable only optical disc of claim 18, wherein the dielectric material is ZnS—$SiO_2$.

23. The high density readable only optical disc of claim 18, further comprising a crystalline reading assist layer composed of Sb or $Sb_2Te_3$ between the substrate and the mask layer.

24. The high density readable only optical disc of claim 18, further comprising a dielectric layer comprising an oxide, a nitride, a sulfide, or a fluoride of a metal, or a mixture thereof, on at least one surface of the mask layer.

25. The high density readable only optical disc of claim 24, wherein the dielectric layer is composed of ZnS—$SiO_2$.

26. The high density readable only optical disc of claim 18, further including a crystalline reading assist layer composed of Sb or $Sb_2Te_3$ between the substrate and the mask layer.

27. The high density readable only optical disc of claim 18, further including a reflective layer disposed on the mask layer.

28. The high density readable only optical disc of claim 27, wherein the reflective layer comprises a metal selected from the group consisting of Au, Al, Cu, Cr, Ag, Ti, Pd, Ni, Zn, Mg, and an alloy thereof.

29. The high density readable only optical disc of claim 27, wherein the reflective layer is formed to a thickness of approximately 50–150 nm.

30. The high density readable only optical disc of claim 29, wherein the reflective layer is formed to a thickness of approximately 60–120 nm.

31. A high density readable only optical disc that allows reading of marks having a size not greater than a reading resolution limit of a laser beam, the disc comprising:
a super-resolution near-field structure having a substrate with a plurality of pits with different lengths in accordance with unit information and a mask layer, wherein a depth of each pit varies according to a length of the respective pit.

32. The high density readable only optical disc of claim 31, wherein the mask layer comprises:
a metal oxide, or
a mixture of fine metal particles and a dielectric material.

* * * * *

UNITED STATES PATENT AND TRADEMARK OFFICE
CERTIFICATE OF CORRECTION

| | | |
|---|---|---|
| PATENT NO. | : 7,087,284 B2 | Page 1 of 1 |
| APPLICATION NO. | : 10/944421 | |
| DATED | : August 8, 2006 | |
| INVENTOR(S) | : Hyun-ki Kim et al. | |

It is certified that error appears in the above-identified patent and that said Letters Patent is hereby corrected as shown below:

Title Page #75
Inventors, change "Du-seep Yoon, Saononam-si" to -- Du-seop Yoon, Seongnam-si --

Signed and Sealed this

Sixth Day of February, 2007

JON W. DUDAS
*Director of the United States Patent and Trademark Office*